United States Patent [19]

Noel et al.

[11] Patent Number: 5,267,511
[45] Date of Patent: Dec. 7, 1993

[54] DEVICE FOR PRESSING BUTTONS BY RESISTING UPWARD MOVEMENT

[75] Inventors: Charles E. Noel, Hamden, Conn.; Mark H. Hamilton, Jaffrey, N.H.

[73] Assignee: Waterbury Companies, Inc., Waterbury, Conn.

[21] Appl. No.: 694,727

[22] Filed: May 2, 1991

Related U.S. Application Data

[63] Continuation-in-part of Ser. No. 648,810, Jan. 31, 1991.

[51] Int. Cl.$^5$ ............................................. B30B 15/02
[52] U.S. Cl. .................................... 100/223; 100/264; 100/265; 100/271; 29/4; 79/1; 79/18
[58] Field of Search ............... 100/223, 265, 264, 270, 100/271, 292, 915, 272; 29/4; 79/1-5, 18

[56] References Cited

U.S. PATENT DOCUMENTS

| | | | |
|---|---|---|---|
| 369,070 | 8/1887 | Naylor | 79/1 |
| 548,304 | 10/1895 | Eberhardt | 100/223 X |
| 653,783 | 7/1900 | Silsby | 79/4 |
| 904,103 | 11/1908 | Wallace | 79/18 X |
| 1,015,167 | 1/1912 | Francis | 100/265 X |
| 1,152,111 | 8/1915 | Lopez et al. | 79/4 |
| 1,421,715 | 7/1922 | Puc | 79/1 X |
| 1,467,130 | 9/1923 | Whitney | 100/223 |
| 1,481,806 | 1/1924 | Montgomery | 100/223 X |
| 2,348,441 | 5/1944 | Walker | 79/1 |
| 2,728,946 | 1/1956 | Pinsenschaum | 100/223 X |
| 2,789,680 | 4/1957 | Kerr | 198/372 |
| 2,931,527 | 4/1960 | Lems | 414/425 |
| 3,179,041 | 4/1965 | Luthi et al. | 100/270 X |
| 3,442,163 | 5/1969 | Chalfin et al. | 79/5 |
| 3,548,689 | 12/1970 | Newig | 79/5 |
| 3,616,942 | 11/1971 | Gruber | 414/627 |
| 3,657,055 | 4/1972 | Nichols | 100/264 X |
| 3,662,626 | 5/1972 | Alpert | 79/4 |
| 3,750,256 | 8/1973 | Elmer | 29/710 |
| 3,771,639 | 11/1973 | Giatti | 198/471.1 |
| 3,802,051 | 4/1974 | Andler et al. | 29/707 |
| 3,802,052 | 4/1974 | Andler et al. | 29/710 |
| 3,815,221 | 6/1974 | Pearl | 29/559 |
| 3,858,462 | 1/1975 | Orlando et al. | 79/5 |
| 4,221,139 | 9/1980 | Peterson | 79/1 |
| 4,391,372 | 7/1983 | Calhoun | 209/523 |
| 4,398,456 | 8/1983 | Prater | 100/272 X |
| 4,532,684 | 8/1985 | Roebuck | 29/4 |
| 4,763,391 | 8/1988 | Yoshioka et al. | 29/33 P |
| 4,850,102 | 7/1989 | Hironaka et al. | 29/787 |
| 4,939,838 | 7/1990 | Gatta | 29/795 |
| 5,113,572 | 5/1992 | Trocola | 29/509 |

FOREIGN PATENT DOCUMENTS

| | | | |
|---|---|---|---|
| 1213209 | 11/1970 | United Kingdom | 79/1 |
| 1222131 | 2/1971 | United Kingdom | 79/1 |

*Primary Examiner*—Stephen F. Gerrity
*Attorney, Agent, or Firm*—Pennie & Edmonds

[57] ABSTRACT

A device is disclosed for pressing objects by lifting the objects into a waiting pressing shaft. The shaft includes a forming element at its lower end for forming the object, and the shaft is engaged by its upper end through a pivot member to an air cylinder in a manner which provides a force advantage to the air cylinder. Also, a system for pressing objects is disclosed, in which the press device is employed in conjunction with a turntable for sequential and continuous pressing operations.

28 Claims, 9 Drawing Sheets

DEVICE FOR PRESSING BUTTONS BY RESISTING UPWARD MOVEMENT

CROSS REFERENCE TO RELATED APPLICATIONS

The present application is a continuation-in-part of application Ser. No. 07/648,810, filed Jan. 31, 1991 (pending).

FIELD OF THE INVENTION

The present invention relates to an automated system for joining objects by pressing, and especially for joining button parts. More particularly, the invention relates to a press for forming objects by forcing them upwardly into a forming element.

BACKGROUND OF THE INVENTION

The manufacture of a two piece button requires the alignment and joining of a front and back portion. Alignment is necessary because the front of the button ordinarily has a design that is intended to be viewed at a particular orientation, and the back of the button has a loop that is to be sewn onto a piece of clothing at a particular orientation. The two pieces must be coordinated if the design on the front is to appear correct to an observer of the clothing.

The joining step, of course, holds the front to the back, and maintains the two pieces at the desired orientation.

At present the button forming operation is carried out manually by an operator using a single press to form buttons one at a time. With one hand, the operator places a front piece into a cradle on the press with the design on the front aligned as desired. A back piece is then placed on the front piece. The operator then activates the press, usually by a foot pedal, to join the pieces together. The completed button is manually removed from the press and the process is repeated.

From the foregoing illustration, numerous shortcomings are apparent in the present mode of button manufacturing. First, the production rate of buttons processed in this fashion is subject to limitations in the operator's faculties, including physical dexterity in handling the button pieces and mental dexterity in aligning them.

Second, and relatedly, the quality control in such a manual process is subject to variations in a given operator's work, and from operator to operator. Thus, the production of properly formed buttons having designs consistently oriented within an acceptable margin of error is difficult if not impossible to achieve.

Third, the basic flow of the manual process requires that a button be produced to completion before the manufacture of the next button is begun.

Finally, the manual operation of a press machine poses occupational hazards to a careless or inattentive press operator.

It is therefore an object of the present invention to improve the production rate of buttons over that of the manual method.

It is another object of the invention to improve the alignment of the button pieces with one another.

It is a further object of the invention to improve the quality control over the button manufacturing process by constraining the range of error which occurs during production.

It is still another object of the invention to provide a streamlined production process in which buttons are simultaneously assembled in a series of steps.

It is yet another object of the invention to provide a button forming machine in which occupational hazards are minimized.

It is an additional object of the invention to provide a press device that repetitively operates to accommodate sequential pressing procedures.

It is a further object of the invention to provide such a press which is capable of absorbing shock to a button piece and applying pressure smoothly and gradually.

It is another object of the invention to provide such a press which is suitable for use with automatic assembly turntables for continuous button production.

SUMMARY OF THE INVENTION

These and other objects are provided for by the press and button assembly system disclosed herein, which comprises means for lifting an object to be pressed into a pressing shaft, and means operatively associated with the lifting means and pressing shaft for resiliently resisting the upward movement of the lifting means thereby pressing the object.

Specifically, a rotating cam causes a lifting shaft to move reciprocally up and down. Upward movement of the lifting shaft forces an object to be pressed against the lower end of a pressing shaft. The upper end of the pressing shaft upwardly engages a first end of a pivot arm, and the second end of the pivot arm is forced downwardly. An air cylinder connected by a shaft to the second end of the pivot arm provides a resilient resistance to the pressing shaft, and the object is therefore pressed between the pressing shaft and lifting shaft.

The invention also comprises a system for automatically and sequentially pressing objects. A turntable carries objects in nests to a pressing station comprising the press device described above. The turntable has a plurality of nests spaced around it, and the nests not at the pressing station can have other operations performed on them simultaneously, such as the loading and unloading of objects.

The nests have shafts extending at least partially through holes in the turntable, and are supported on the turntable by collars that are wider than the holes.

When an object is to be pressed, the lifting shaft of the press engages the nest shaft and forces it upwardly. The upper side of the nest, and the object inside the nest, engage the lower end of the pressing shaft, and a pressing operation is carried out.

Clearance gaps are provided between the nests and the lifting and pressing shafts, to allow for the arrival and departure of nests on the rotating turntable. A gap may also be provided between the pressing shaft and pivot arm. In such case, the pressing shaft is independently suspended by a collar.

After each pressing operation, the lifting shaft, nest, and pressing shaft drop back to a lowermost normal position, under the effect of gravity.

BRIEF DESCRIPTION OF THE DRAWINGS

These and other preferred features of the invention are shown in the attached drawing figures, wherein.

DETAILED DESCRIPTION OF THE PREFERRED EMBODIMENTS

Figure 1:
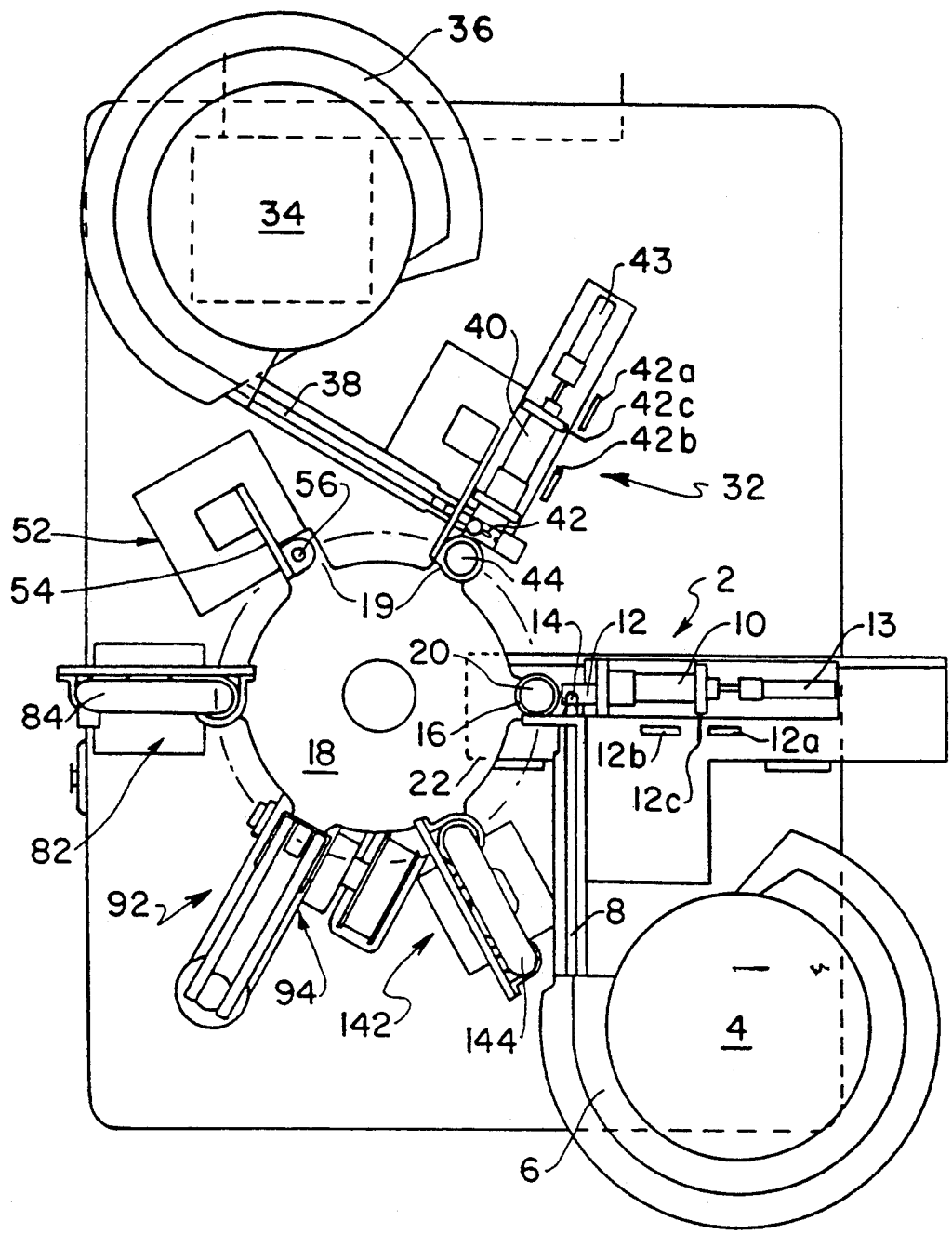
FIG. 1 is a plan view of the machine of the present invention as seen from above.
Figure 2:
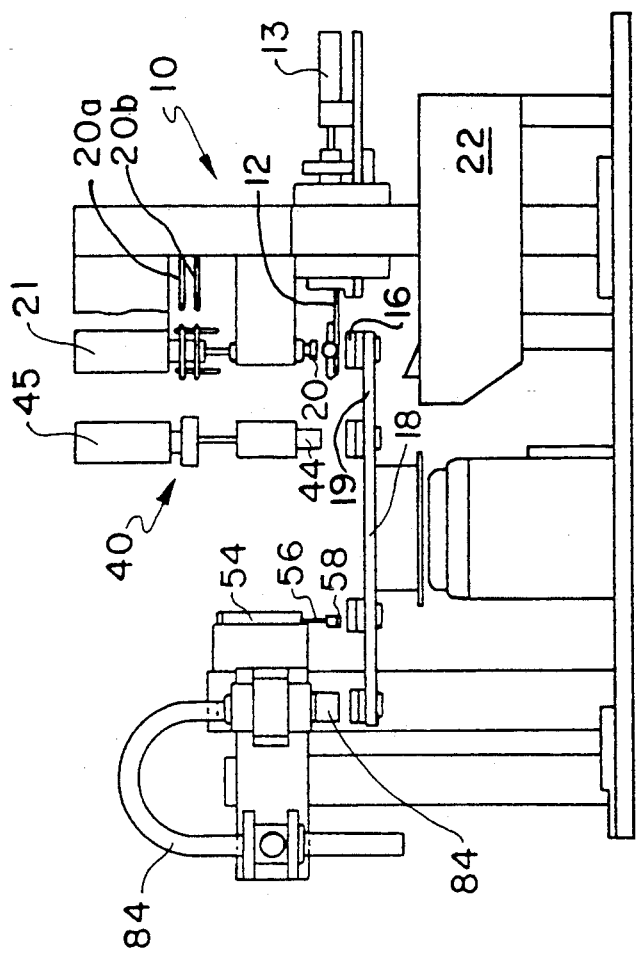
FIG. 2 is a side plan view of the machine of FIG. 1, showing the first through fourth button assembly stations.
Figure 3:
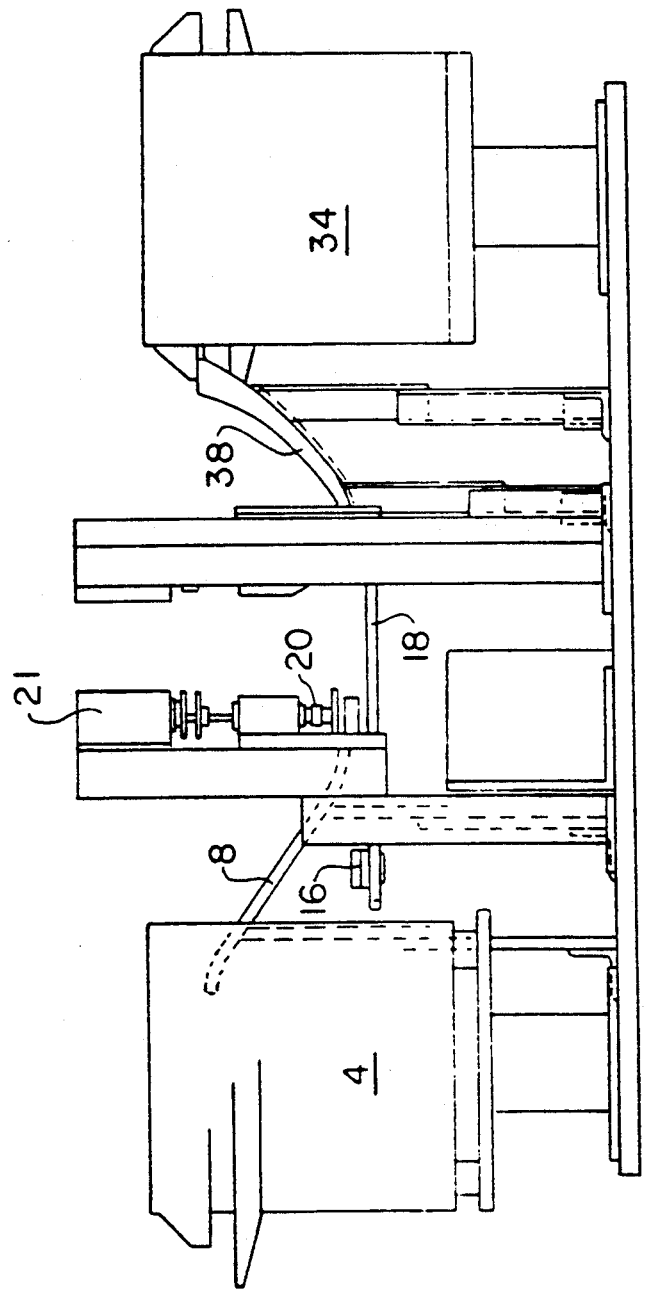
FIG. 3 is another side view of the machine of FIG. 1, showing the first and second stations and their associated vibrating bowls and tracks for supplying button parts.

According to the present invention as shown in FIGS. 1-3, at a first work station 2, button front shells are fed into a vibrating bowl 4 having a helical interior track 6 which orients the shells all in the same direction for subsequent forwarding to the assembly turntable. The vibrating bowl may be any of a number of commonly known and available devices, such as those made by Parts Feeder, Inc., East Hartford, Conn.

The shells leaving the vibrating bowl are positioned face down, with the open rear portion of the shell facing upwardly. These shells slide down a slotted track 8 to a pick and place mechanism 10. At the pick and place mechanism, a tray 12 receives a shell lying front down into a nest 14 in the tray. Tray 12 then moves horizontally under the action of air cylinder 13 toward the turntable until the shell is over the location at which nests 16 on a turntable 18 successively stop to receive shells. As shown in FIG. 2, a vertically-moving suction-operated finger 20 engages the open rear portion of the shell, lifting it upwardly to clear tray 12, which then withdraws to accept the next shell. Finger 20 lowers the shell to nest 16 and releases it, whereby gravitational force causes the shell to drop neatly into the nest.

The vertical movement of finger 20 is preferably controlled by an air cylinder 21. Any suitable robotic means for grasping and releasing may be used. According to a preferred embodiment of the present invention, vacuum suction is used to pick up and hold the shell. The suction is cut off when the shell is to be released.

Referring again to FIG. 1, the turntable 18 is a circular disk having six nubs 19 located at 60 degree intervals about the circumference of the turntable, and protruding beyond the circumference. Nests 16 are located on nubs 19.

Before each nest is rotated into position below finger 20, a video camera 22 positioned below the turntable and finger, as shown in FIGS. 1 and 2, takes a picture of the shell as it is held by the finger mechanism. Nubs 16 block the camera's line of sight when they arrive at the pick and place mechanism, but because they protrude from the turntable a clear view is available between the departure of one nub and the arrival of the next. Pick and place mechanism 10 is therefore coordinated with turntable 18 so that finger 20 holds a shell in line with camera 22 before a nu arrives.

The picture thus obtained is displayed on a conventional video terminal which is located in a computer control panel. The computer programming includes a data base of 36 images of the particular shell design, representing the shell oriented at 10° rotational increments. The computer program compares the image taken of the actual shell in position on the finger mechanism and compares it to the 36 images in its memory to determine the approximate orientation of the shell design (within 5 degrees).

The preferred video/computer controller for use with the present invention is the Itran MVP-2000 Machine Vision Processor, made by Itran Corp. of Manchester, N.H. The Itran unit performs the comparison of stored images with the images supplied by camera 22, and provides the necessary information to carry out the step of properly orienting a button back before placing it with a shell.

Associated with the vision processor is a Macintosh computer that acts as an interface between a human operator and the vision processor. This interface is necessary because, according to the preferred mode of operating the invention, each different button design requires the performance of an initialization procedure to enter its image into the memory of the vision processor. It is possible to avoid this procedure, by providing a memory base containing different sets of button design images for each type of button to be joined by the machine. The computer capacity required for that setup is believed to be economically unjustified for a finite number of different button types, and because the Macintosh computer has been found suitable for performing this task in an acceptable time frame.

Thus, the interface provided by the Macintosh is a basic program that instructs the human operator on the steps to be carried out, and transmits the data obtained to the vision processor. To run the start-up program, the turntable is placed halfway between two index positions (this position is confirmed by ferrous metal sensor 166, see FIG. 16), in order to expose camera 22 to pick and place finger 20. Finger 20 is fed a button shell of the desired design, and an image of that shell design is sent to the vision processor. The processor artificially rotates the image in its memory in successive 10° increments, until a database of 36 images is obtained. The start-up procedure takes about fifteen minutes to execute.

A third computer control unit is also employed in the present invention. A microprocessor controller is used to coordinate and execute the various operations being simultaneously performed. Suitable controller components are made by Baldor/Delta Tau, Inc. of Canoga Park, Calif. The use of microprocessors in this manner is well known and is within the ability of a person skilled in the art.

After a shell has been imaged and loaded into a nest at the first station, the shell is then advanced to a second work station 32. This work station includes another vibrating bowl assembly 34, which provides button backs to another pick and place mechanism 40. The button backs are identically aligned as they are fed to pick and place mechanism 34, and this common alignment is maintained by entry of the backs into slotted track 38. Pick and place mechanism 40 consequently receives every back at the same position.

Pick and place mechanism 40 is identical in many respects to mechanism 10 at the first station. Tray 42 receives button backs with loops up, and transports them horizontally under the action of air cylinder 43 toward the turntable until they are directly over the position where the nests 16 are successively stationed. The backs are then picked up with suction by finger 44, as FIG. 2 illustrates, and tray 42 retracts. The vertical movement of finger 44 is controlled by air cylinder 45.

Figure 4:
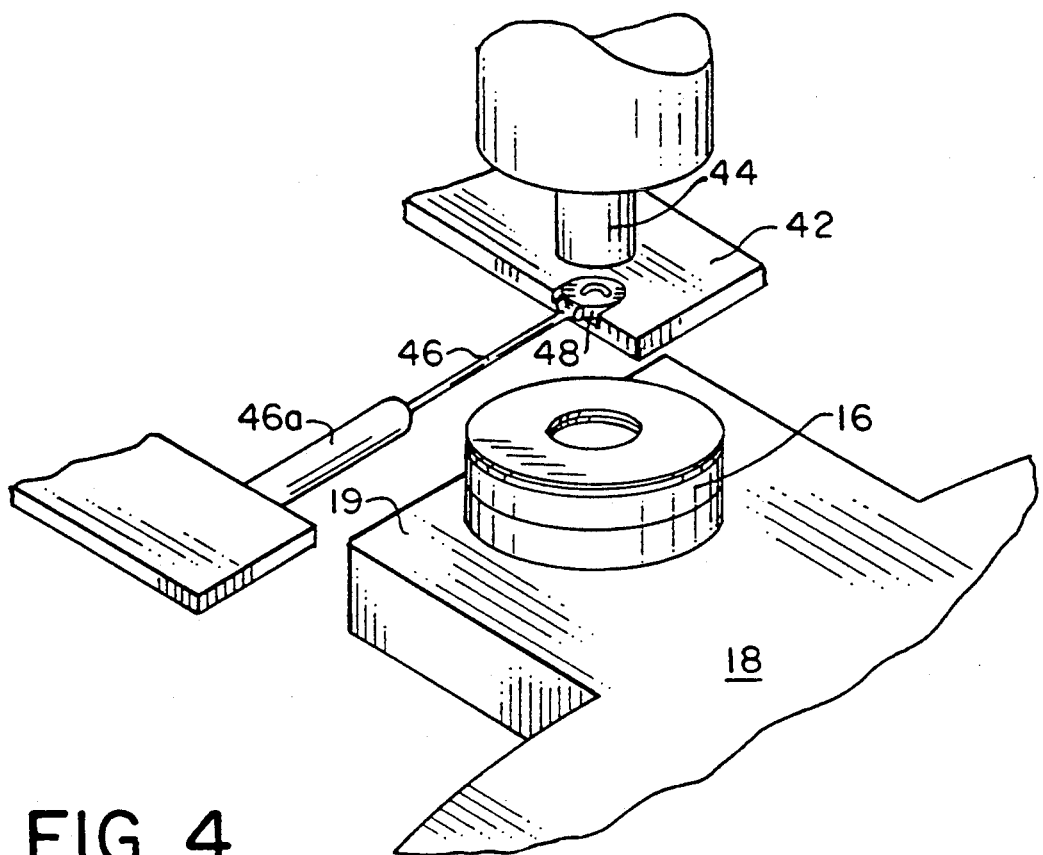
FIG. 4 is a close-up view of the pick and place mechanism of the second station.

According to a preferred embodiment of the present invention, button backs within tray 42 are stabilized while finger 44 picks them up. Thus, FIG. 4 shows that a brace 46 extends to block the opening 48 in tray 42 where button backs enter the tray, when tray 42 extends to supply a back to finger 44. Brace 46 is moved by air cylinder 46a, mounted on support 46b.

The next step is to place the button back into the button shell so that the desired orientation between the two parts is achieved. In addition to vertical movement, finger 44 is capable of rotational movement. Due to the camera imagery, the computer has determined the approximate (±5°) orientation of the button shell within the nest, and this information is used to provide information for rotating the finger by an approximate number of degrees before placing the back into the shell to achieve the proper relative orientation of the back to the shell design. Due to the configuration of the button back (which is symmetrical about a 180° axis), the rotation mechanism only needs to rotate the back by a maximum of plus or minus 90 degrees to achieve the proper rotational position. The work at this station is completed when the button back at the proper rotational position is placed into the shell in the nest.

The movements of trays 12, 42 and fingers 20, 44 are monitored and controlled by ferrous metal sensors, also known as proximity switches. Two of these sensors are used in connection with each tray and each finger. One sensor detects when its tray or finger is fully retracted, and the other detects full extension.

FIG. 1 shows the sensors associated with trays 12, 42. Sensors 12a, 42a detect the retracted position of trays 12, 42 based on the proximity of trigger arm 12c, 42c. The extended tray position is similarly detected by sensors 12b, 42b.

FIG. 2 shows the sensors associated with finger 20 on pick and place mechanism 10. Sensor 20a detects the raised position of finger 20 in which a button shell has been lifted from the tray. Sensor 20b detects the lowermost extended position of finger 20, in which the shell is placed in a nest on the turntable. A similar arrangement is used to monitor the position of finger 44 at pick and place mechanism 40, but is not shown in FIG. 2.

Satisfactory sensors for use in the present invention include the model BI2-G12-AP6X, made by Turck Multiprox, Inc., Minneapolis, Minn.

The aforementioned microprocessor uses impulses from the sensors to coordinate and time the functions being performed. Thus, a signal that the tray is fully extended is used to determine that a button part is to be picked up from the tray. Upon a signal that the finger (carrying the button part) has retracted, the tray then retracts. A signal that the tray has retracted prompts a command for the finger to extend, place, and release the button part. The tray will extend with another button part once the finger sensor indicates full retraction. If the sequence of signals corresponding to this process is not maintained, as determined by the improper position of any components in the various work stations by the proximity sensor, production will automatically be stopped to prevent damage to the machine.

The button assembly then proceeds to a third station 52, shown in FIGS. 1 and 2, where a crimping mechanism 54 fixes the back to the shell by providing three crimp points along the circumference of the button. This prevents the button from losing alignment as it proceeds through the final stations of the machine. The crimper also stretches the edge material of the button parts, which eases the final forming of the buttons and improves the appearance of the final product, because the final forming press is given more material with which to work.

Figure 5:
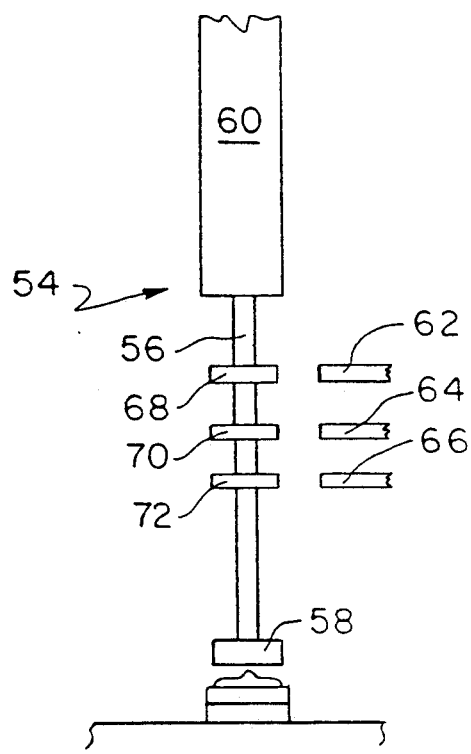
FIG. 5 is a close-up view of the crimper and detection device of the third station.

As shown in FIG. 5, crimper 54 operates by a vertically moving shaft 56, having a lower end 58 which crimps the button parts when shaft 56 is forced downwardly. Movement of shaft 56 is preferably produced by an air cylinder 60.

The crimper assembly includes sensors for detecting when incomplete button assemblies are crimped. In such cases, the button parts are to be rejected before final pressing. To identify the presence of incomplete buttons, a series of three sensors 62, 64, 66 is provided, corresponding to three metal discs 68, 70, 72 mounted coaxially on shaft 56. The top sensor 62 corresponds to top disc 68, and is responsible for monitoring when the shaft 56 reaches its retracted position. Bottom sensor 66, corresponding to disc 72, detects when a single button part is missing, based on the extra downward movement of the shaft 56 which will occur. Middle sensor 64, corresponding to middle disc 70, will detect when no button parts are present. "Mechanical" rejects are those determined by crimper 54 to be incomplete.

After crimping is completed and information about rejects gathered, the button assembly proceeds to the fourth station 82. Vacuum line 84, shown in FIGS. 1 and 2, will be engaged when sensors 62, 64, 66 determine that a mechanical defect has been generated, to remove any such defective buttons.

"Visual" rejects occur when camera 22 at the first station sends an image that the computer is unable to match to any in its memory. This occurs if no shell or a shell with an improper design is loaded, and the defect is removed by the vacuum line 84 when instructed to do so by the microprocessor. Otherwise, vacuum line 84 remains inactive.

Vacuum line 84 is commanded by the computer in any of these instances to apply suction when the right nest (i.e., the one containing the defect) arrives. An exception is that when it is determined that a nest is completely empty, i.e., that no button parts are present, then vacuum 84 will not operate, in order to conserve energy and equipment.

Rejected buttons are removed from the turntable and placed in a waste bin. The waste items can then be returned to the manufacturer as scrap for rework.

Figure 6:
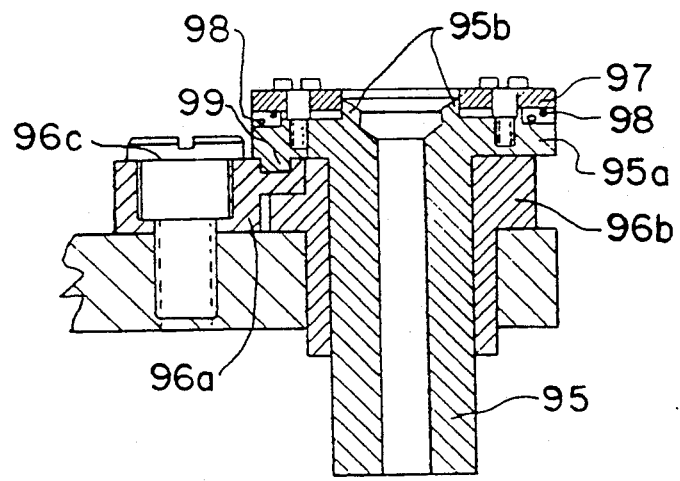
FIG. 6 is a cross-sectional view of a button holding nest suitable for use with the turntable of the present invention.

Referring again to FIG. 1, those buttons which are properly manufactured proceed past station four to be finally formed at a fifth station 92 by a press 94. In order to understand the operation of press 94, further detail regarding the construction of nests 16 may be helpful. As shown in FIG. 6, nests 16 comprise a shaft 95, collar 95a, stripper disc 97, and wave spring 98. The nests also have an annular rim 95b which fits concentrically within a hole in stripper 97. Rim 95b defines the portion in which a button assembly is held. Stripper 97 also acts to keep a button in place, and for this purpose normally extends above rim 95b. Wave spring 98 urges stripper 97 away from the collar 95a in order to maintain that higher normal position.

It is desirable, however, to provide for greater exposure of the button during crimping and pressing steps. Accordingly, stripper 97 can be retracted by pushing against spring 98 until the stripper meets collar 95a. At that point, the button will be surrounded only by the lower rim 95b and will be more exposed for crimping or pressing.

As FIG. 6 shows, nest 16 sits with its collar 95a resting on supports 96a, 96b. Preferably, collar 95a includes a key 99 disposed into a slot in support section 96a, which is held static by screw 96c. This prevents the shaft and collar portion of nest 16 from rotating, which could otherwise occur when turntable 18 is rotated from station to station.

The keyed design of nest 16 is especially important to the movement between the first and second stations, where rotation of the nest would cause deviation of the button shell loaded at the first station from its original, recorded orientation. Such deviation would result in a less accurate alignment between the button back and button shell, because the computer-guided placement of the button back would be based on inaccurate data.

An alternative and preferred type of nest does not use a stripper and wave spring to provide extra stability to a button. Instead, a vacuum source applies suction to the nest to hold the button parts, and a low rim 95b is the only solid restraint needed. The greater portion of the button is exposed constantly in this embodiment, facilitating the crimping and pressing operations.

When the vacuum type nest is used, however, it is necessary to remove the suction at stations where the button or button parts might be removed. A rotary valve 102 for effecting this selective application of vacuum and atmospheric pressure is shown in FIGS. 7-11.

Figure 12:
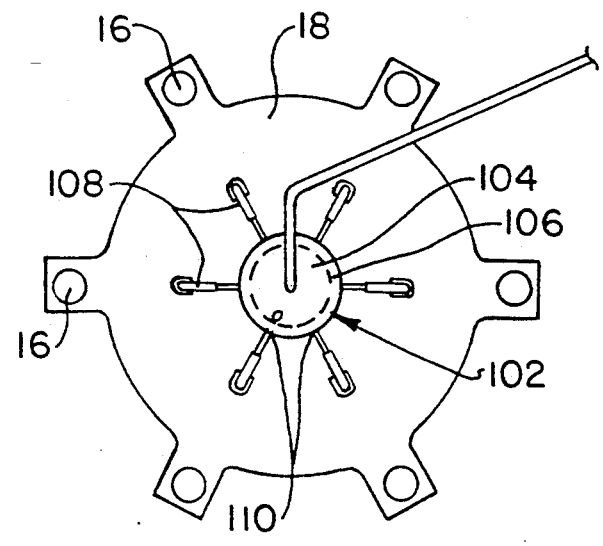
FIG. 12 is a plan view of the turntable of the present invention, equipped with a rotary valve.
Figure 7:
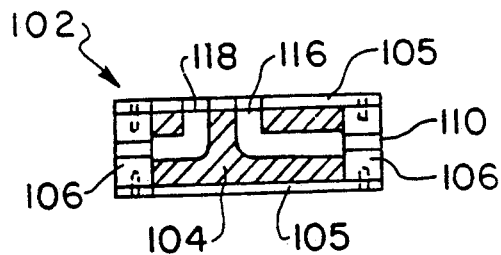
FIG. 7 is a cross-sectional view of the rotary valve of the present invention.
Figure 8:
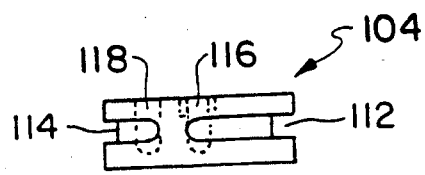
FIG. 8 is a side view of the rotor element of the rotary valve of FIG. 7.
Figure 10:
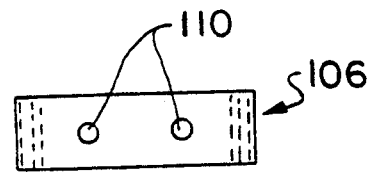
FIG. 10 is a side view of the distribution collar element of the rotary valve of FIG. 7.
Figure 9:
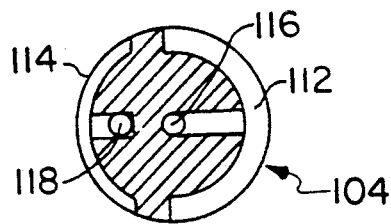
FIG. 9 is a top view of the rotor element of the rotary valve of FIG. 7.
Figure 11:
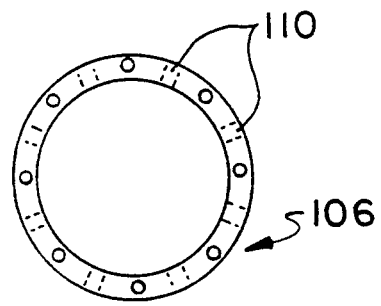
FIG. 11 is a top view of the distribution collar element of the rotary valve of FIG. 7.

Rotary valve 102 has two basic components: a central rotor 104, shown in FIGS. 8 and 9, and an annular distribution collar 106, shown in FIGS. 10 and 11. Rotor 104 fits within collar 106, and the two are held between plates 105, shown in FIG. 7. As shown in FIG. 12, valve 102 is mounted in the center of turntable 18, coaxially therewith. Nests 16 are connected by hoses 108 to openings 110 in collar 106, which is fastened to turntable 18 so that nests 16, collar 106 and hoses 108 rotate together on the turntable.

Rotor 104, on the other hand, is fastened to a stationary object off the turntable; rotor 14 does not rotate, in order that collar 106 can rotate around it.

Referring to FIGS. 7-9, rotor 104 has two channels 112, 114 around its circumference which communicate with openings 110 in collar 106 around the rotor. Channels 112, 114 separately lead to two openings 116, 118, respectively, in the top of rotor 104. A source of vacuum is connected to one of these openings, and the other is left exposed to atmospheric pressure (although each opening could be connected to positive or negative pressure as desired).

As the collar 106 rotates around rotor 104, openings 110, shown in FIGS. 7, 10 and 11, are alternately put in communication with channel 112 and then channel 114. By selecting a rotor 104 with channels 112, 114 in a particular arrangement, and by aligning those channels with the stations around the outside of the turntable, vacuum or atmospheric pressure is selectively applied to the nests at those stations.

The parts of rotary valve 102 are all ground to the proper minimum clearance necessary to assure smooth and reliable operation. No gaskets are necessary, because when properly ground and fitted, the parts combine in a substantially leak-proof fit.

Figure 13:
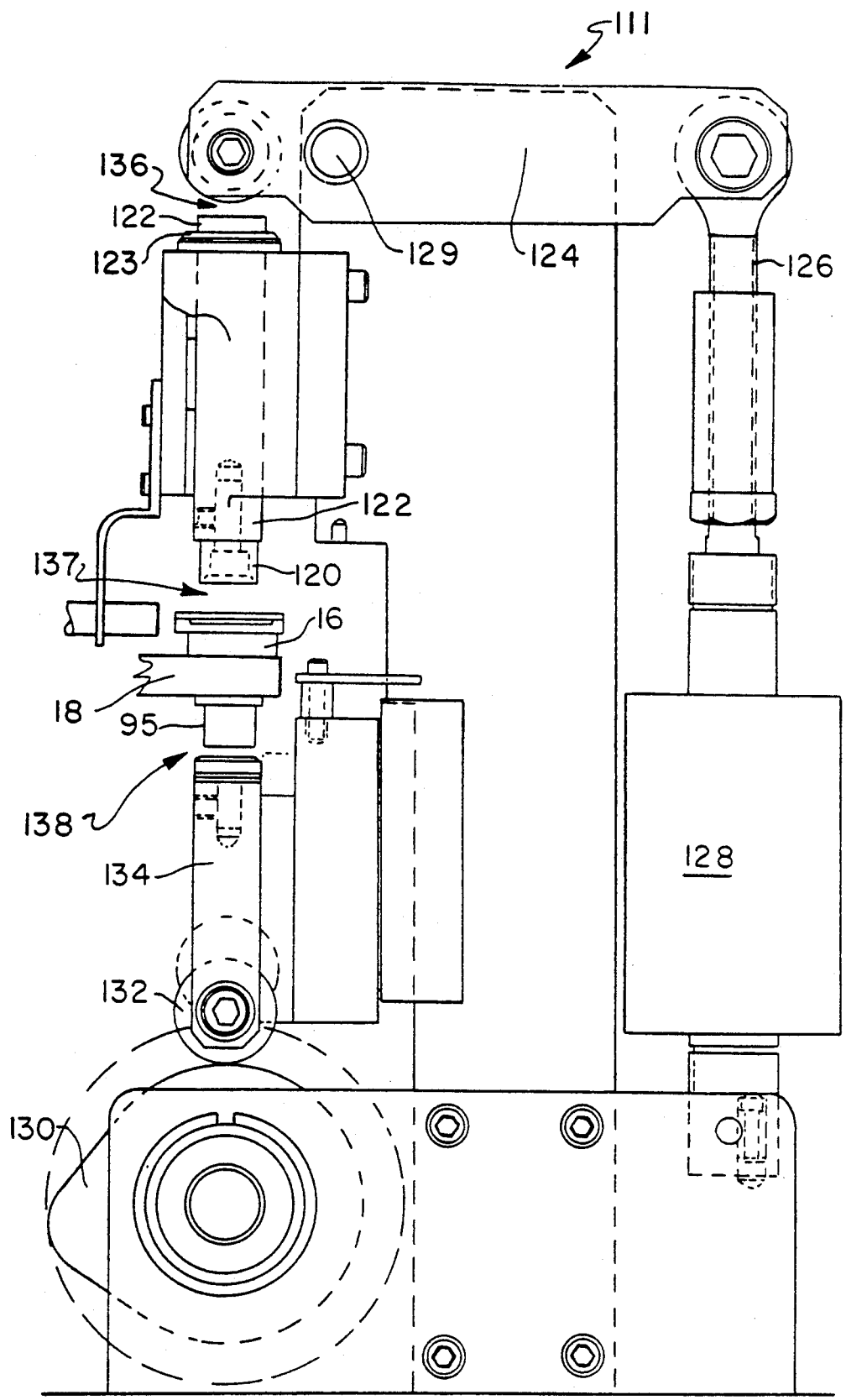
FIG. 13 is a plan view of the press mechanism used at the fifth station of the present invention.
Figure 14:
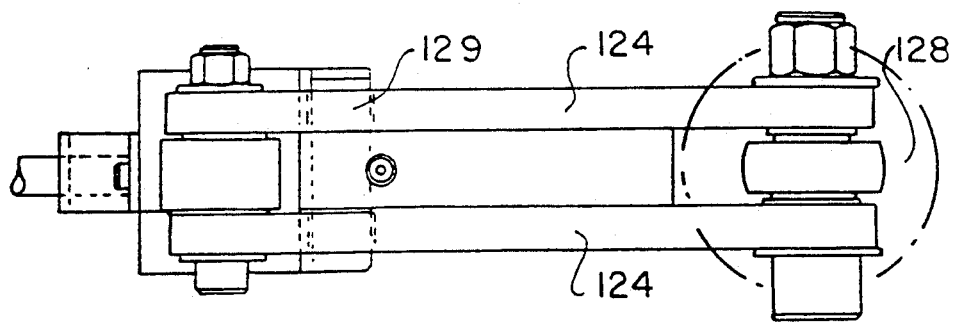
FIG. 14 is a top view of the linkage arms of the press mechanism of FIG. 13.
Figure 15:
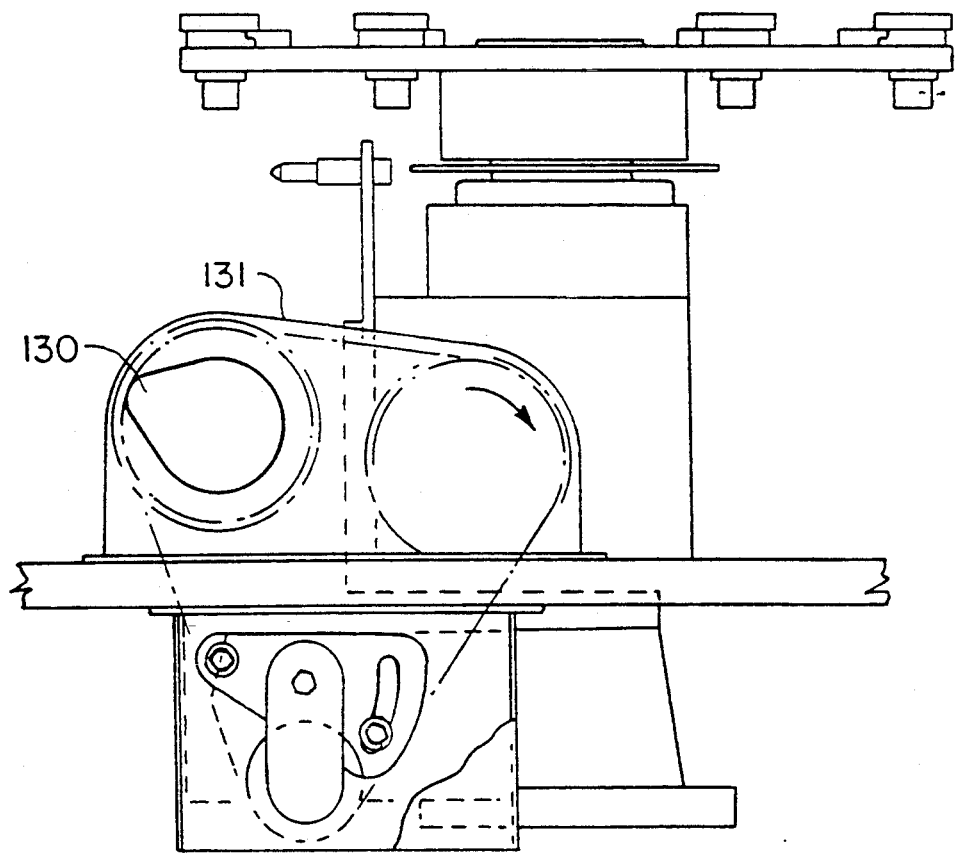
FIG. 15 is a side plan view of the drive mechanism for the press mechanism of FIG. 13.

The functioning of press 94 at the fifth station 92 will now be described with reference to FIGS. 13-15. Essentially, press 94 operates by pushing nests 16 upwardly from turntable 18 and into a waiting forming element 120. As described earlier, nests 16 comprise shafts 95. These shafts extend through openings in nubs 19 of turntable 18, and hang down below the turntable. Nest shafts 95, and therefore nests 16, may be forced upwardly for some distance without being disengaged from turntable 18.

To force nests 16 upwardly, a cam 130 is provided, on which cam follower 132 rides. Cam 130 is rotated by pulley 131 driven by motor 133, as shown in FIG. 15. The pulley, in turn, is driven by the motor of the indexing apparatus, which can be any suitable commercial device, as further explained below. Such an indexing apparatus commonly employs a motor that imparts constant rotary motion to a main indexer shaft. The intermittent indexing motion of the turntable is the result of a cam configuration on the main shaft (the turntable is typically indexed one station for every 360° rotation of the main shaft).

Pulley 131 is driven by this main shaft of the indexer, and cam 130 causes operation of press 94 intermittently in the same way that the indexer effects intermittent rotation of turntable 18. Timing the two events so that press 94 operates in between the rotational movements of the turntable is a matter of adjusting the orientation of cam 130 to be properly interrelated with the rotational position of the shaft and the orientation of the indexing cam to the shaft, as is known by those persons skilled in the art. One pressing step is to be performed for each nest, which requires one pressing step per indexing step.

Referring back to FIG. 13, cam follower 132 is a wheel mounted on lifting shaft 134. Lifting shaft 134 impacts the end of nest shaft 95 when shaft 134 is moved by cam 130. Nest 16 is thereby forced upwardly, and forming element 120 presses the button in the nest.

Lifting shaft 134 then falls back to its original position as cam follower 132 continues to follow the shape of the rotating cam 130. Nest 16 correspondingly falls back to the turntable surface. The turntable will not rotate again until nest 16 has fallen back, in order to prevent the nest from colliding with objects above the surface of the turntable. This is provided for by proximity switch 127, which senses the presence of nest 16 when nest 16 is seated on the surface of turntable 18.

The scale of movement required to form the buttons at press 94 is not great. For example, the clearances and forces can be arranged so that nests 16 are moved upwardly about 0.5" to contact forming element 120, and forming element 120 absorbs the impact by recoiling approximately 0.125", as further described below.

Forming, element 120 is mounted on the end of a linkage 111 comprising three arm segments 122, 124, 126. Forming element 120 is mounted on the lower end of pressing shaft 122. Air cylinder shaft 126 is part of an air cylinder 128, which provides a shock absorbing, resilient resistance to the action of the press forcing a button and nest against forming element 120. A linkage arm may also be used for connecting air cylinder shaft 126 to pivot arm 124, if space considerations so warrant.

Pivot arm 124 operatively associates segments 122 and 126. Pivot arm 124 also acts as a lever pivoted at pivot point 129, located one fourth of the distance from the end engageable with pressing shaft 122 to the end connected to air cylinder shaft 126. This gives the shock absorbing cylinder 128 a 3:1 force advantage over the action of the press, which allows a lighter duty cylinder to be employed. Specifically, about 1200 lbs. pressure is used to close the buttons. Cylinder 128 needs to be only 400 lbs. in capacity, however, due to the position and arrangement of linkage 111.

The various moving parts of the press need not, and indeed cannot, be actually connected together. It is preferable for several clearance gaps to be left between the parts. Thus, a clearance gap 136 is provided between the upper end of the pressing shaft and the pivot arm. Gap 137 is provided between forming element 120 and the top of nests 16. Gap 138 is provided between the upper end of lifting shaft 134 and nest shafts 95. Gaps 137 and 138 are necessary When a turntable is used to rotate successive nests into position above lifting shaft 134 and below pressing shaft 120.

Because gaps are provided on both sides of nests 16 and pressing shaft 122, means for supporting those elements are needed when they are not being forced upwardly by engagement of lifting shaft 134 with nest shafts 95. Nests 16 are supported on the surface of turntable 18 by their collar portions, which are wider than the holes in turntable 18 through which nest shafts 95 extend. Pressing shaft 122 is supported by providing it with a collar 123, which establishes a lowermost normal position in which the shaft will be suspended under the force of gravity, when not engaged by nest 16.

Once the pressing step has been carried out, the completed button assembly then moves to a sixth work station 142, shown in FIG. 1, where all properly assembled buttons are removed by vacuum line 144 into a container for shipment. As mentioned previously, vacuum line 144 will operate intermittently (i.e., only when a button is present) to conserve energy and equipment.

Rotation of turntable 18 in the intermittent, sequential manner required by the present invention may be provided by any of a number of indexing apparatus commonly available and known to a person of ordinary skill in the art. One such device suitable for use with the present invention is the Camco Indexer Model 400RA, manufactured by Emerson Power Train Corporation, Wheeling, Ill.

Figure 16:
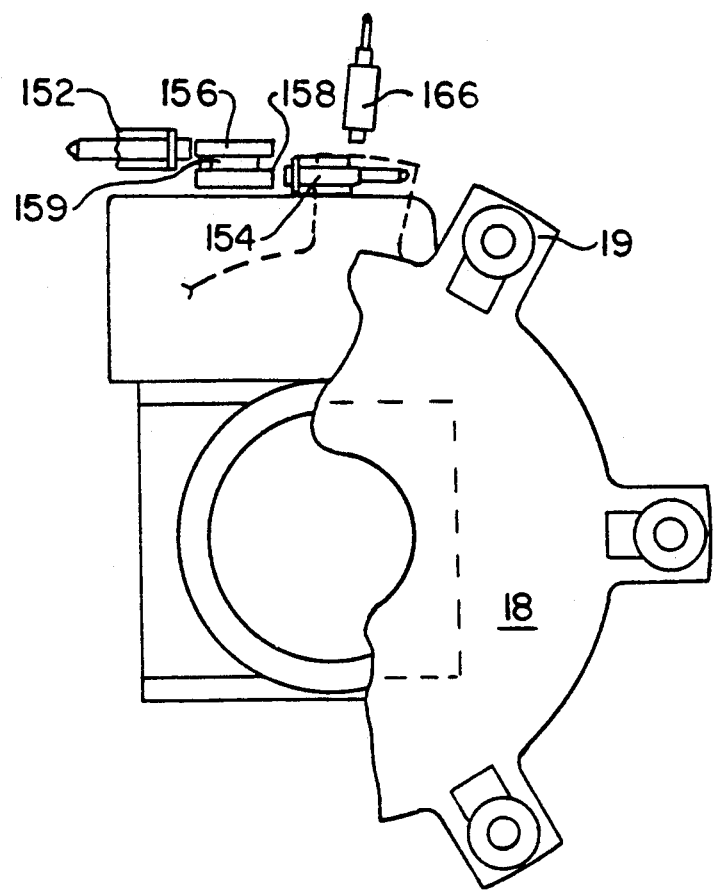
FIG. 16 is a cut-away view of the turntable of the present invention, showing sensors for monitoring the indexing position of the turntable.

The indexer is monitored as part of the assembly operation through numerous signals sent by proximity switches to the microprocessor throughout the assembly operation. Four switches monitor the actual rotational position of the turntable, and are shown in FIGS. 15 and 16.

A pair of switches 152, 154 detect when the turntable is being indexed and when it is not being indexed (i.e., in a "dwell" position). These switches respectively cooperate with cams 156, 158 mounted on the indexer shaft 159. The cams are shaped so that their surfaces periodically come close to the switches and then move away. The cams are oriented so that one of them triggers its respective proximity switch when the turntable is indexing, and the other cam triggers its switch when the turntable is in the dwell position.

Another switch is used to register disengagement of the indexer clutch, which occurs when the turntable's rotation is jammed. The indexer motor is shut off in response to that event. FIG. 15 shows that proximity switch 162 senses plate 164. When the indexer clutch disengages, plate 164 moves upwardly and triggers switch 162.

Finally, a fourth proximity switch 166 is employed to indicate when the turntable is in a half-indexed position (i.e., halfway between indexed positions). Switch 166 senses the side of any one of nubs 19 when the turntable is rotated in the vicinity of a half-indexed position. The turntable is placed in this position when the video controller is to be initialized, as explained earlier. It is necessary to move the turntable out of index for the initialization procedure, in order to give the camera 22 a clear view of a button shell held by pick and place mechanism 10.

We claim:

1. A press comprising:
   means for supporting an object;
   means for lifting the object support means in an upward path along a first distance; and
   means operatively associated with the lifting means for pressing the object by resiliently resisting upward movement of the object support means by a second distance which is less than said first distance, said pressing means including an air cylinder for providing a force which increasingly resists upward movement of the lifting means.

2. The press of claim 1 wherein the pressing means includes means for deforming at least a portion of the object.

3. The press of claim 1 wherein the pressing means includes a pressing shaft having an end engageable with a first end of a linkage, wherein a second opposed end of said linkage is connected to said air cylinder such that said pressing shaft is operatively associated with said air cylinder.

4. The press of claim 3, wherein the air cylinder includes a shaft; the first end of the pressing shaft contacts the object when the lifting means lifts the object; and the pressing means further comprises a pivot arm having first and second ends for transmitting force from the air cylinder shaft to the pressing shaft to resist the upward movement of the lifting means.

5. The press of claim 4, wherein the first end of the pivot arm is engageable with the second end of the pressing shaft, and the second end of the pivot arm is engageable with the air cylinder shaft.

6. The press of claim 4, further comprising a linkage arm having a first and second opposed ends, and wherein the first end of the pivot arm is engageable with a second end of the pressing shaft, and the second end of the pivot arm is engaged to the first end of said linkage arm, and the second end of the linkage arm is engaged to said air cylinder shaft.

7. The press of claim 4 wherein, when the object is not lifted by the lifting means, the first end of the pressing shaft is separated from the object by a first clearance gap, and the second end of the pressing shaft is separated from the first end of the pivot arm by a second clearance gap.

8. The press of claim 7, wherein the pressing shaft further comprises a collar for independently suspending the pressing shaft when the pressing shaft is not engaged with the object.

9. The press of claim 4, wherein the first end of the pivot arm receives force from the pressing shaft; the second end of the pivot arm transmits force to the air cylinder; with the pivot arm including a pivot point.

10. The press of claim 9 wherein the pivot point is located closer to the first end for imparting a force advantage to the air cylinder.

11. The press of claim 9, wherein the pivot point is located about one fourth of the distance from the first end to the second end for imparting a force advantage of about 3:1 to the air cylinder.

12. The press of claim 4, wherein the lifting means comprises a cam, means for rotating the cam, and a lifting shaft having a first end for following the surface of the cam and a second end for supporting the object, said lifting shaft reciprocally movable in response to rotation of the cam.

13. The press of claim 12, wherein the first end of the lifting shaft comprises a wheel for following the surface of the cam.

14. The press of claim 13, wherein the first end of the lifting shaft includes means for holding the object, and the pressing shaft comprises a deforming element for at least partially deforming the object when the holding means is lifted by the lifting means.

15. The press of claim 14 wherein, when the object is not lifted by the lifting shaft, the first end of the pressing shaft is separated from the object by a first clearance gap; the second end of the pressing shaft is separated from the first end of the pivot arm by a second clearance gap; and the second end of the lifting shaft is separated from the holding means by a third clearance gap.

16. The press of claim 14, wherein the holding means comprises a collar for independently suspending the holding means when the holding means is not engaged by the second end of the lifting shaft.

17. A press comprising:
means for supporting an object;
means for lifting the object support means in an upward path along a first distance; and
means operatively associated with the lifting means for pressing the object by resiliently resisting upward movement of the object support means by a second distance which is less than said first distance, wherein the pressing means includes a pressing shaft having first and second opposed ends operatively associated with an air cylinder, wherein the air cylinder includes a shaft; the first end of the pressing shaft contacts the object when the lifting means lifts the object; and the second end of the pressing shaft is connected to one end of the air cylinder shaft.

18. A press comprising:
a cam;
means for rotating the cam;
a lifting shaft having first and second ends for lifting an object in an upward path along a first distance, wherein the first end includes a wheel for following the surface of the cam, and the second end supports the object;
an air cylinder comprising a shaft for resiliently resisting the upward lifting of the object;
means for holding the object, having a collar for independently suspending the holding means above the second end of the lifting shaft, and separated from the second end of the lifting shaft by a first clearance gap, when the object is not lifted by the lifting shaft;
a pressing shaft having first and second opposed ends, for resiliently resisting upward movement of the holding means, and having a collar for independently suspending the pressing shaft above the holding means when the object is not lifted by the lifting shaft; the first end of the pressing shaft contacting the holding means, and the second end of the pressing shaft engageable with a linkage connected to the air cylinder such that the pressing shaft transmits force from the air cylinder when the lifting shaft lifts the object in the holding means; and the holding means and the first end of the pressing shaft are separated by a second clearance gap when the object is not lifted by the lifting shaft; and
a pivot arm having first and second ends, for transmitting force from the air cylinder to the pressing shaft to resist the upward movement of the retaining means by a second distance which is less than said first distance, wherein the first end of the pivot arm is engageable with the second end of the pressing shaft, and the second end of the pivot arm is engageable with the air cylinder, and wherein said pivot arm is pivoted at a pivot point located closer to the first end of the pivot arm than the second end of the pivot arm, for imparting a force advantage to the air cylinder.

19. A system for sequentially and automatically pressing objects comprising:
a turntable having at least one means for supporting an object, the object support means having a shaft extending at least partially through a hole in the turntable, and a collar for suspending the object support means in a lowermost position on the turntable;
means for lifting the object support means in an upward path along a first distance; and
means for pressing the object by resiliently resisting the upward movement of the retaining means by a second distance which is less than said first distance.

20. The system of claim 19, wherein the turntable has a plurality of object support means, and further comprising means for indexing the turntable to sequentially place each of said at least one object support means in a pressing position above the lifting means and below the pressing means.

21. The system of claim 20, further comprising means for causing one pressing operation to be performed for each object support means placed in the pressing position.

22. The press of claim 19, wherein the pressing means includes means for providing a force which increasingly resists upward movement of the lifting means.

23. The press of claim 19 wherein the pressing means includes means for deforming at least a portion of the object.

24. A system for sequentially and automatically pressing objects comprising:
a turntable having at least one means for supporting an object, the object support means having a shaft extending at least partially through a hole in the turntable, and a collar for suspending the object support means in a lowermost position on the turntable;

means for lifting the object support means in an upward path along a first distance; and means for pressing the object by resiliently resisting the upward movement of the retaining means by a second distance which is less than said first distance wherein the pressing means comprises a pressing shaft having first and second opposed ends, and an air cylinder having a shaft, said first end of said pressing shaft engageable with a first end of a linkage, wherein a second opposed end of said linkage is connected to said air cylinder.

25. The system of claim 24, further comprising a pivot arm having first and second opposed ends, said first end of said pivot arm engageable with said pressing shaft, said second end of said pivot arm connected to said first end of said linkage, for transmitting force from the air cylinder shaft to the pressing shaft to resist the upward movement of the lifting means.

26. The system of claim 25, wherein the pressing shaft further comprises a collar, positioned below the first end of the pivot arm and above the at least one object supporting means, for independently suspending the pressing shaft when the pressing shaft is not engaged with the object.

27. The system of claim 25 wherein the first end of the pivot arm is separated from the second end of the pressing shaft by a first clearance gap, the first end of the pressing shaft is separated from the object support means by a second clearance gap, and the object support means is separated from the lifting means by a third clearance gap when the object is not lifted by the lifting means.

28. The system of claim 25, wherein the pivot arm is pivoted at a pivot point located closer to the first end of the pivot arm than the second end of the pivot arm, for imparting a force advantage to the air cylinder.

* * * * *